United States Patent
Fujita et al.

(10) Patent No.: US 12,532,175 B2
(45) Date of Patent: Jan. 20, 2026

(54) NETWORK DEVICE, COMMUNICATION CONTROL SYSTEM, COMMUNICATION CONTROL METHOD, AND NON-TRANSITORY COMPUTER READABLE STORAGE MEDIUM

(71) Applicant: Yamaha Corporation, Hamamatsu (JP)

(72) Inventors: Shogo Fujita, Hamamatsu (JP); Kosuke Onoyama, Hamamatsu (JP); Koji Onda, Hamamatsu (JP); Satoshi Miyagishima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 619 days.

(21) Appl. No.: 17/982,632

(22) Filed: Nov. 8, 2022

(65) Prior Publication Data
US 2023/0164558 A1    May 25, 2023

(30) Foreign Application Priority Data
Nov. 24, 2021   (JP) .................................. 2021-190422

(51) Int. Cl.
| | | |
|---|---|---|
| *H04W 12/06* | (2021.01) | |
| *H04W 12/069* | (2021.01) | |
| *H04W 12/69* | (2021.01) | |

(52) U.S. Cl.
CPC ......... *H04W 12/069* (2021.01); *H04W 12/69* (2021.01)

(58) Field of Classification Search
CPC ............................ H04W 12/069; H04W 12/69
See application file for complete search history.

(56) References Cited

U.S. PATENT DOCUMENTS

| | | | |
|---|---|---|---|
| 9,253,019 B1* | 2/2016 | Romanov | H04L 61/2517 |
| 11,087,170 B2* | 8/2021 | Malaya | G06V 10/82 |
| 11,487,963 B2* | 11/2022 | Angel | G06F 18/23211 |
| 11,544,501 B2* | 1/2023 | Dong | G06N 3/0499 |

(Continued)

FOREIGN PATENT DOCUMENTS

| | | | |
|---|---|---|---|
| JP | 2010-98597 A | 4/2010 | |
| JP | 2012-34142 A | 2/2012 | |

(Continued)

OTHER PUBLICATIONS

English translation of Japanese-language Office Action issued in Japanese Application No. 2021-190422 dated Sep. 9, 2025 (3 pages).

*Primary Examiner* — Rupal Dharia
*Assistant Examiner* — Devin E Almeida
(74) *Attorney, Agent, or Firm* — Crowell & Moring LLP

(57) ABSTRACT

A communication system includes a first network device including a RADIUS server configured to determine whether to authenticate a network communication of a terminal, or a first RADIUS client corresponding to a RADIUS server and storing identification information identifying the RADIUS server and a secret key, and a second network device directly connected to the first network device in the same network segment as the first network device. The first network device includes a first processor and a first memory device configured to store a first program, the first program being executed by the first processor to cause the first processor to transmit the identification information and the secret key to the second network device in a first time period.

11 Claims, 12 Drawing Sheets

(56) References Cited

U.S. PATENT DOCUMENTS

| | | | |
|---|---|---|---|
| 11,829,193 B2* | 11/2023 | Shukla | G06N 20/00 |
| 2003/0037163 A1* | 2/2003 | Kitada | H04L 12/4645 |
| | | | 709/236 |
| 2006/0015724 A1* | 1/2006 | Naftali | H04L 63/162 |
| | | | 713/168 |
| 2006/0212928 A1* | 9/2006 | Maino | H04L 63/20 |
| | | | 726/4 |
| 2011/0176681 A1 | 7/2011 | Yamada et al. | |
| 2013/0103836 A1* | 4/2013 | Baniqued | H04L 61/5014 |
| | | | 709/226 |
| 2013/0124865 A1 | 5/2013 | Nakano | |
| 2013/0185767 A1* | 7/2013 | Tirupachur Comerica | |
| | | | H04L 63/08 |
| | | | 726/4 |
| 2016/0352731 A1* | 12/2016 | Mentze | H04L 63/0876 |
| 2019/0253891 A1* | 8/2019 | Spencer | H04L 67/02 |
| 2020/0050945 A1* | 2/2020 | Chen | G06N 3/09 |
| 2020/0082097 A1* | 3/2020 | Poliakov | G06F 21/577 |
| 2020/0134374 A1* | 4/2020 | Oros | G06N 3/09 |
| 2020/0252213 A1* | 8/2020 | Vijayan | G06F 16/275 |
| 2021/0056541 A1 | 2/2021 | Kim | |

FOREIGN PATENT DOCUMENTS

| | | | | |
|---|---|---|---|---|
| JP | 2017-139650 A | | 8/2017 | |
| KR | 20160026101 A | * | 3/2016 | H04L 9/32 |

\* cited by examiner

| | Identification information (IP address) 1030a | Secret key 1030b |
|---|---|---|
| First access point (RADIUS server) | 192.168.100.241 | abcde |
| Client network information | 192.168.100.0/24 | abcde |

| | Identification information (IP address) 1130a | Secret key 1130b |
|---|---|---|
| First access point (RADIUS server) | 192.168.100.241 | abcde |

| Device | Identification information (IP address) 2030a | Secret key 2030b |
|---|---|---|
| First access point (RADIUS server) | 192.168.100.241 | abcde |

| Device | Identification information (IP address) 2130a | Secret key 2130b |
|---|---|---|
| First access point (RADIUS server) | 192.168.100.241 | abcde |

NETWORK DEVICE, COMMUNICATION CONTROL SYSTEM, COMMUNICATION CONTROL METHOD, AND NON-TRANSITORY COMPUTER READABLE STORAGE MEDIUM

CROSS-REFERENCE TO RELATED APPLICATIONS

This application claims the benefit of priority to Japanese Patent Application No. 2021-190422, filed on Nov. 24, 2021, the entire contents of which are incorporated herein by reference.

FIELD

The present disclosure relates to a network device, a communication control system, a communication control method, and a non-transitory computer readable storage medium.

BACKGROUND

Conventionally, there is a communication system that requires authentication to connect a communication terminal to a network. In such a communication system, in order to manage authentication information of a communication terminal, the communication terminal is authenticated by an authentication server connected to a network device such as an access point. For example, an IEEE (Institute of Electrical and Electronics Engineers) 802.1X of a network device is authenticated. A RADIUS (Remote Authentication Dial-in User Service) authentication is applied as a method of authentication. A RADIUS server is used as a server for RADIUS authentication. Japanese laid-open patent publication No. 2017-139650 discloses a method of authentication of a communication terminal using the RADIUS server.

SUMMARY

According to an embodiment of the present disclosure, there is provided a communication system including a first network device including a RADIUS (Remote Authentication Dial-in User Service) server configured to determine whether to authenticate a network communication of a terminal, or a first RADIUS client corresponding to a RADIUS server, and storing identification information identifying the RADIUS server and a secret key, and a second network device directly connected to the first network device in the same network segment as the first network device. The first network device includes a first processor; and a first memory device configured to store a first program, the first program being executed by the first processor to cause the first processor to: transmit the identification information and the secret key to the second network device in a first time period. The second network device includes a second processor; and a second memory device configured to store a second program, the second program being executed by the second processor to cause the second processor to: receive the stored identification information and the secret key transmitted from the first network device, and set the second network device based on the identification information and the secret key so that the second network device operates as a second RADIUS client corresponding to the RADIUS server.

BRIEF DESCRIPTION OF DRAWINGS

FIG. 5 is a diagram showing an example of a data set included in a first access point according to an embodiment of the present disclosure.

FIG. 6 is a diagram showing an example of a data set included in a second access point according to an embodiment of the present disclosure.

FIG. 7 is a diagram showing an example of a data set included in an L2 switch according to an embodiment of the present disclosure.

FIG. 12 is a diagram showing an example of a data set included in an L2 switch according to an embodiment of the present disclosure.

DESCRIPTION OF EMBODIMENTS

Figure 1:
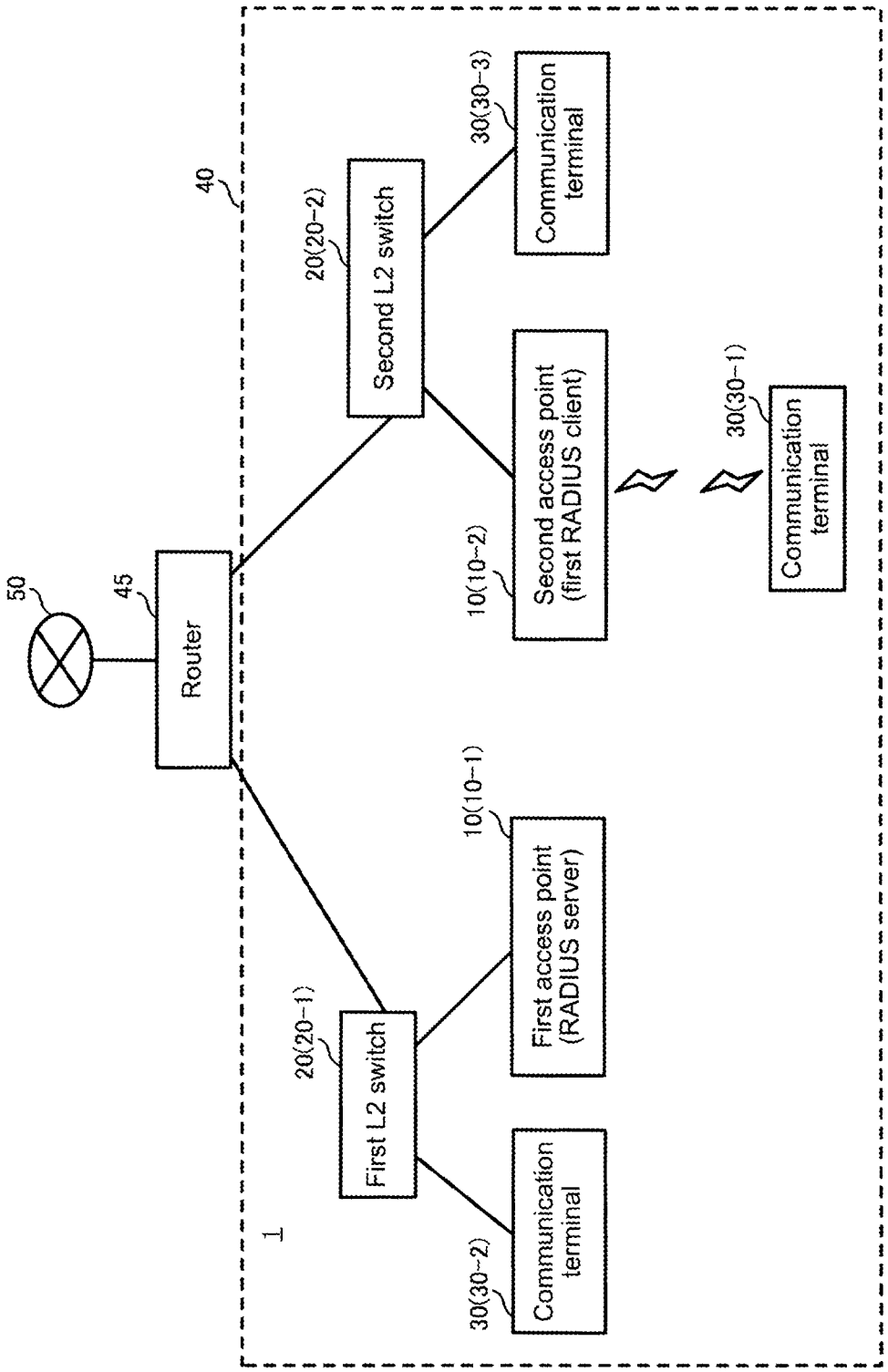
FIG. 1 is a schematic diagram showing an overall configuration of a communication control system according to an embodiment of the present disclosure.

Hereinafter, embodiments of the present disclosure will be described with reference to the drawings and the like. However, the present disclosure can be implemented in many different aspects and should not be construed as being limited to the description of the embodiments exemplified below. Although the drawings may be schematically represented for clarity of explanation, they are merely examples, and do not limit the interpretation of the present disclosure. The terms "first" and "second" appended to each element are convenience signs used to distinguish each element, and do not have any further meaning unless otherwise specified. Also, in the drawings referred to in the present embodiment, the same or similar parts are denoted by the same symbols or similar symbols (symbols denoted only by A, B, 1, 2, and the like attached to numerals XXX), and repeated descriptions thereof may be omitted. In addition, a part of the configuration may be omitted from the drawings. In addition, no particular explanation shall be given for elements which a person ordinarily knowledgeable in the field to which the present disclosure pertains can recognize.

When certificating by a RADIUS server, a RADIUS client corresponding to the RADIUS server is set. A communication terminal authenticates by the RADIUS server through the RADIUS client. However, setting up the RADIUS client requires inputting setting information by a user. Therefore, when the RADIUS client needs to be set, the user needs to input setting information each time, which is very complicated.

The present disclosure discloses a system which enables the RADIUS client to be easily set.

According to the present disclosure, it is possible to easily set a RADIUS client.

First Embodiment

A communication control system according to a first embodiment of the present disclosure will be described in detail with reference to the drawings.

(1-1. Configuration of Communication Control System)

FIG. 1 is a block diagram showing a configuration of a communication control system 1. As shown in FIG. 1, the communication control system 1 includes an access point 10 (a first access point 10-1, a second access point 10-2), an L2 switch 20 (a first L2 switch 20-1, a second L2 switch 20-2), and a communication terminal 30.

The communication control system 1 constitutes one network 40 provided under a router 45. For example, the network 40 is an intranet which is an example of a closed network. The intranet is, for example, a LAN (Local Area Network). Therefore, it can be said that the first access point 10-1, the second access point 10-2, the first L2 switch 20-1, the second L2 switch 20-2, and the communication terminal 30 exist in the same network segment. In FIG. 1, the first access point 10-1 and the second access point 10-2 are connected by wiring through the first L2 switch 20-1, the second L2 switch 20-2, and the router 45. The first access point 10-1 and the first L2 switch 20-1 are directly connected via wiring. Similarly, the second access point 10-2 and the second L2 switch 20-2 are directly connected via wiring. A communication terminal 30-1 is wirelessly connected to the second access point 10-2. Communication terminals 30-2 and 30-3 are connected to the first L2 switch 20-1 or the second L2 switch 20-2 via wiring.

(1-1-1. Access Point 10)

In the communication control system 1, the access point 10 (the first access point 10-1 and the second access point 10-2) is a network device (also referred to as a first network device) connected to the L2 switch 20 and the communication terminal 30 by wiring or wirelessly via the network 40. The access point 10 has a function of relaying the communication terminal 30 and the L2 switch 20 (or the router 45). In addition, in the present embodiment, the first access point 10-1 (also referred to as a controller access point) among the access point 10 also functions as a RADIUS server. The RADIUS server determines whether to authenticate a network communication of the connected communication terminal 30. The second access point 10-2 (also referred to as a member access point) may also function as a RADIUS client corresponding to the RADIUS server as described below. Also, in the present embodiment, when the first access point 10-1 and the second access point 10-2 are not distinguished from each other, they will be described as the access point 10.

Figure 2:
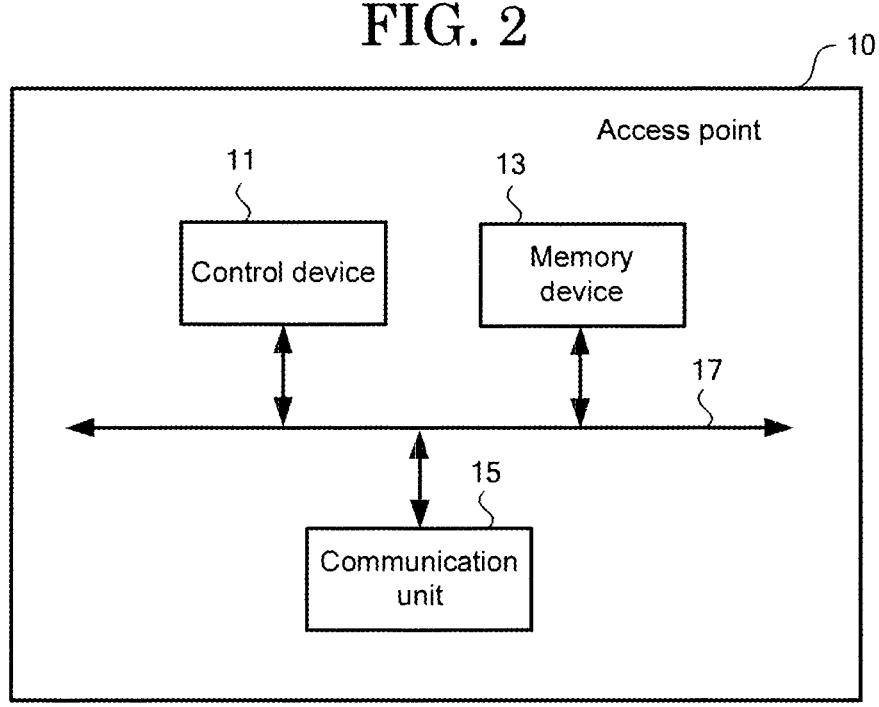
FIG. 2 is a block diagram showing a hardware configuration of an access point according to an embodiment of the present disclosure.

FIG. 2 is a configuration diagram of hardware of the access point 10. As shown in FIG. 2, the access point 10 includes a control device 11, a memory device 13, and a communication unit 15. The control device 11, the memory device 13, and the communication unit 15 are connected via a wiring bus 17.

The control device 11 includes a CPU (Central Processing Unit), an ASIC (Application Specific Integrated Circuit), an FPGA (Field Programmable Gate Array), or other calculation processing circuits, and a memory including a ROM (Read Only Memory) and RAM (Random Access Memory). The control device 11 controls the functions of each unit by using a communication control program included in the memory.

In addition to a semiconductor memory such as an SSD (Solid State Drive), a magnetic recording medium (a magnetic tape, a magnetic disk, or the like), an optical recording medium, a magneto-optical recording medium, or a storage medium such as a memorable element is used as the memory device 13. The memory device 13 has a function as a database for storing various types of information used in the communication control program.

The communication unit 15 is an interface for transmitting and receiving information by connecting to external devices (the L2 switch 20 and the communication terminal 30) by wiring or wirelessly under the control of the control device 11. In the present embodiment, the communication unit 15 is connected to the other access point 10 by wiring via the L2 switch 20 and the router 45. The communication unit 15 communicates with the L2 switch 20 by wiring. In this case, a connector to which a cable or the like is connected is used for the communication unit 15. The communication unit 15 wirelessly communicates with the communication terminal 30. In this case, for example, a communication module capable of performing communication using a wireless LAN, Bluetooth (registered trademark), or the like is used for the communication unit 15.

(1-1-2. L2 Switch 20)

The layer 2 (L2) switch 20 (the first L2 switch 20-1 and the second L2 switch 20-2) is a network device (also referred to as a second network device) that relays each terminal through the network 40. In the present embodiment, when the first L2 switch 20-1 and the second L2 switch 20-2 are not distinguished from each other, they will be described as the L2 switch 20.

Figure 3:
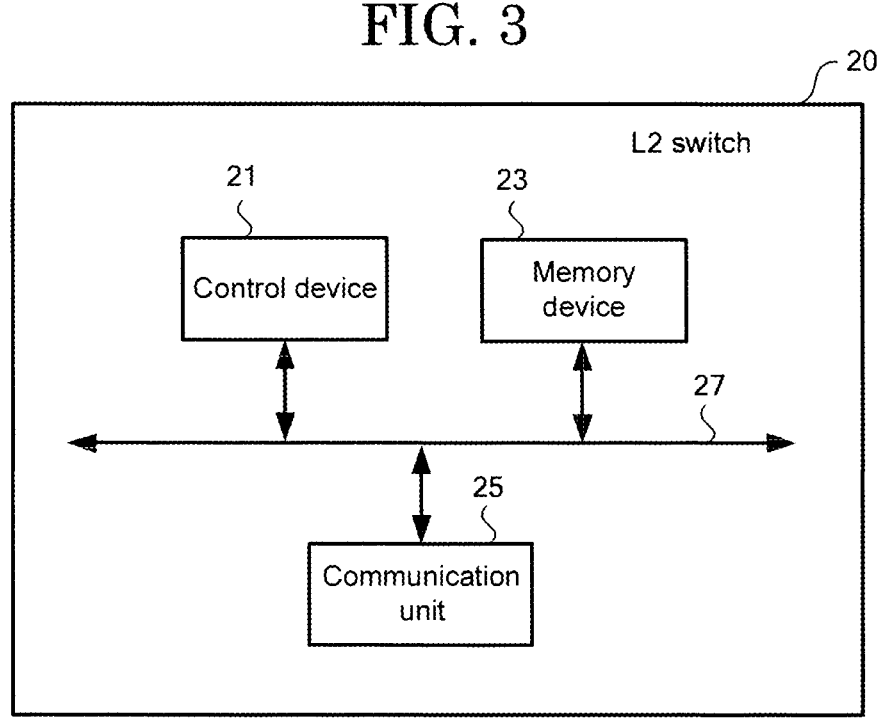
FIG. 3 is a block diagram showing a hardware configuration of an L2 switch according to an embodiment of the present disclosure.

FIG. 3 is a block diagram showing an example of a hardware configuration of the L2 switch 20. As shown in FIG. 3, the L2 switch 20 includes a control device 21, a memory device 23, and a communication unit 25. The control device 21, the memory device 23, and the communication unit 25 are connected via a wiring bus 27.

The control device 21 controls each unit of the L2 switch 20 by using the communication control program. The memory device 23 has a function as a database for storing various types of information related to the communication control program. The communication unit 25 is an interface for transmitting and receiving information by connecting to external devices (the access point 10, the communication terminal 30, and the router 45) under the control of the control device 21. Also, devices similar to those of the access point 10 can be used for the control device 21 and the memory device 23. A connector to which a cable or the like is connected is used for the communication unit 25.

(1-1-3. Communication Terminal 30)

The communication terminal 30 is a computing device that requires authentication by the RADIUS server. When authenticated by the RADIUS server, the communication terminal 30 may communicate with the other communication terminal 30 provided in the network 40 and a server or a communication terminal connected to a network 50 (e.g., the Internet) provided outside the network 40. When not authenticated by the RADIUS server, the communication terminal 30 may not communicate with the other communication terminal 30 provided in the network 40 and a server or a communication terminal connected to the network 50, even if the communication terminal 30 is connected to the access point 10 or the L2 switch 20. A personal computer is used as the communication terminal 30. Also, the communication terminal 30 is not limited to a personal computer and may be a mobile phone (feature phone), a smart phone, a tablet-type terminal, and an IoT (Internet of Things) device (a device including a power source mechanism, a communication function, and an information storage mechanism), or the like, as long as it can communicate with each device through a network.

Although an example in which the first access point 10-1 functions as the RADIUS server and the second access point 10-2 functions as the RADIUS client is shown in the present embodiment, the present disclosure is not limited thereto. The first access point 10-1 may have a function as the RADIUS client in addition to the function of the RADIUS server. In this case, the first access point 10-1 may have a function as the access point, a function as the RADIUS server, and a function as the RADIUS client. As a result, when the communication terminal 30 is connected to the first access point 10-1, it is possible to perform the network authentication of the communication terminal without connecting to another network device having a function of a RADIUS client.

(1-2. Functional Block Diagram of Communication Control System)

Figure 4:
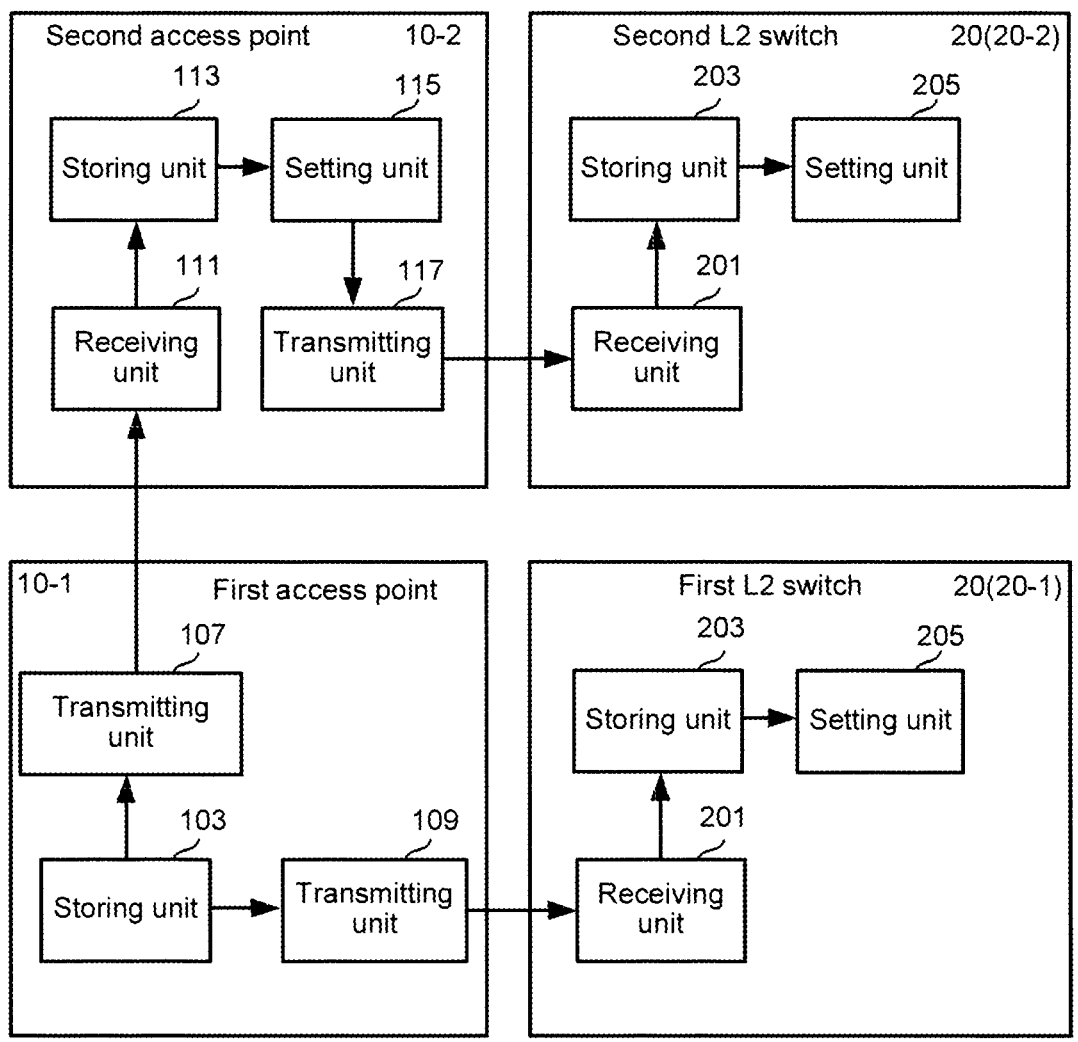
FIG. 4 is a functional block diagram of a communication control system according to an embodiment of the present disclosure.

FIG. 4 is a block diagram showing an example of a functional configuration of the communication control system 1. Each function described below is realized by hardware, software, or a combination of hardware and software.

In FIG. 4, the first access point 10-1 includes a storing unit 103, a transmitting unit 107, and a transmitting unit 109.

The storing unit 103 stores RADIUS server information. FIG. 5 is an example of a data set of stored RADIUS server information 1030. As shown in FIG. 5, the RADIUS server information 1030 includes identification information 1030*a* of the RADIUS server (the first access point 10-1) and a secret key 1030*b* common in the network 40. In this example, an IP address is used as the identification number 1030*a*. A password is used as the secret key 1030*b*. In addition, the storing unit 103 may store identification information of the client network in addition to the identification information of the RADIUS server.

The transmitting unit 107 transmits the stored RADIUS server information to the second access point 10-2 through the L2 switch 20 and the router 45 by wiring.

The transmitting unit 109 (also referred to as a first transmitting unit) transmits the stored RADIUS server information to the first L2 switch 20-1 by wiring. In this case, the first access point 10-1 and the first L2 switch 20-1 are directly connected to each other. Therefore, the transmitting unit 109 can transmit the RADIUS server information to the first L2 switch 20-1 within a predetermined time period (also referred to as a first time period). For example, the RADIUS server information may be stored in an LLDP (Link Layer Discovery Protocol) frame and transmitted.

In FIG. 4, the second access point 10-2 includes a receiving unit 111, a storing unit 113, a setting unit 115, and a transmitting unit 117.

The receiving unit 111 (also referred to as a second receiving unit) receives the RADIUS server information transmitted from the first access point 10-1. The storing unit 113 stores the received RADIUS server information. FIG. 6 is an example of a data set of information 1130 stored in the second access point 10-2. As shown in FIG. 6, the stored information 1130 includes identification information 1130*a* and a secret key 1130*b*. In this case, the RADIUS server information (the identification information of the first access point 10-1 and the secret key common in the network 40) is stored in the second access point 10-2.

The setting unit 115 (also referred to as a second setting unit) sets the second access point 10-2 to operate as the RADIUS client based on the RADIUS server information.

The transmitting unit 117 (also referred to as a second transmitting unit) transmits the stored RADIUS server information to the second L2 switch 20-2. In this case, the second access point 10-2 and the second L2 switch 20-2 are directly connected to each other. Therefore, the transmitting unit 117 can transmit the RADIUS server information within the predetermined time period (the first time period). For example, the RADIUS server information may be stored in the LLDP frame and transmitted.

In FIG. 4, the first L2 switch 20-1 and the second L2 switch 20-2 include a receiving unit 201, a storing unit 203, and a setting unit 205. Since the first L2 switch 20-1 and the second L2 switch 20-2 have the same functional units, they will be collectively described as the L2 switch 20.

The receiving unit 201 receives the RADIUS server information transmitted from the first access point 10-1 or the second access point 10-2.

The storing unit 203 stores the received RADIUS server information. FIG. 7 is an example of a data set of information 2030 stored in the L2 switch 20. As shown in FIG. 7, the stored information 2030 includes identification information 2030*a* and a secret key 2030*b*. In this case, the RADIUS server information (the identification information and the secret key of the first access point 10-1) is stored in the L2 switch 20.

The setting unit 205 sets the L2 switch 20 to operate as a RADIUS client (also referred to as a second RADIUS client) based on the stored RADIUS server information.

(1-3. Communication Control Processing)

Figure 8:
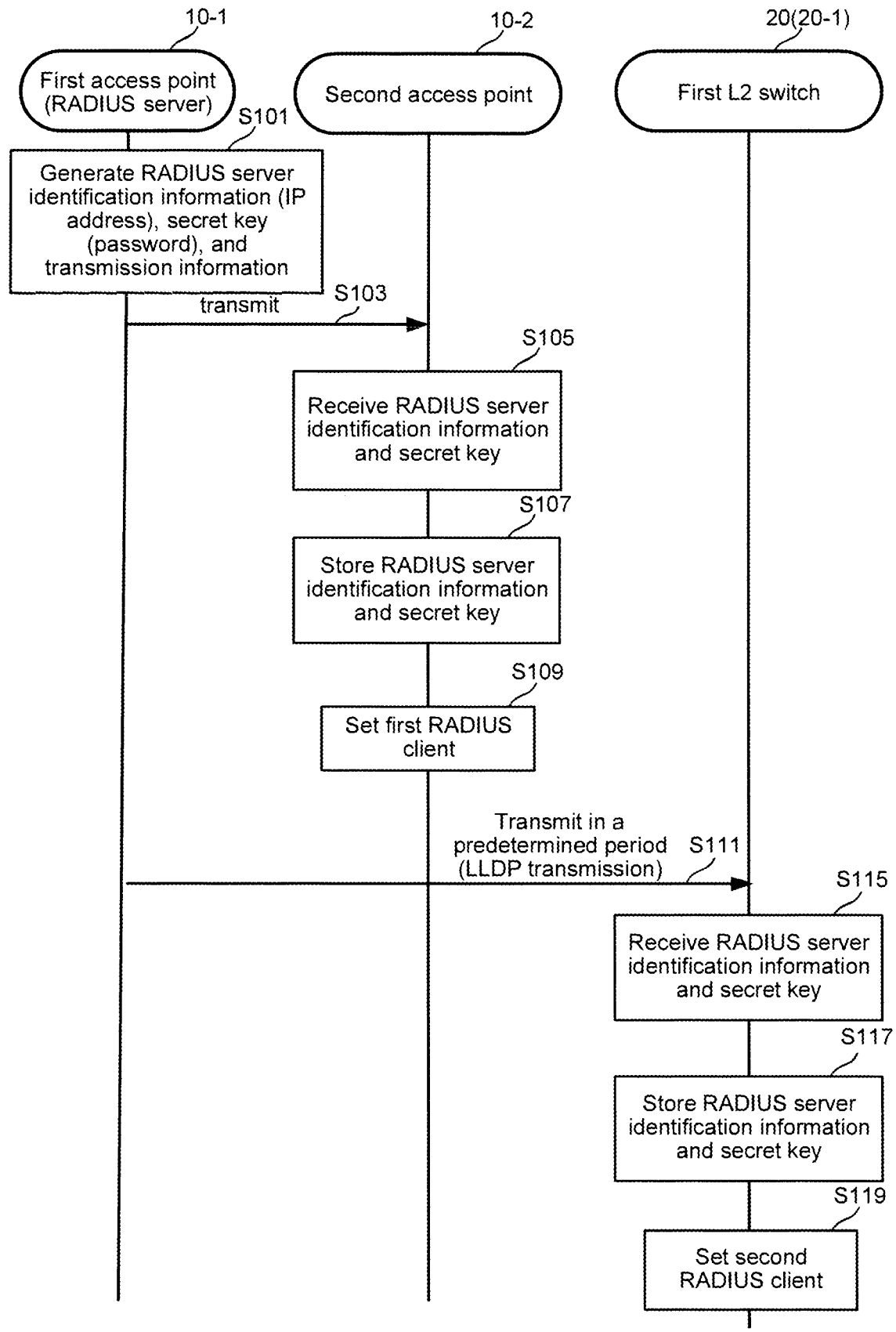
FIG. 8 is a flowchart showing an example of a flow of processing executed by a communication control system according to an embodiment of the present disclosure.

Next, communication control processing based on a command by the communication control program will be described with reference to FIG. 8 and FIG. 9.

First, the first access point 10-1 functioning as the RADIUS server stores the RADIUS server information. As shown in FIG. 5, the RADIUS server information 1030 includes the identification information (IP address) of the first access point 10-1 and the secret key (password) generated for the RADIUS client existing in the same network 40. The first access point 10-1 generates transmission information for transmitting the RADIUS server information (S101).

The first access point 10-1 transmits the stored RADIUS server information to the second access point 10-2 (S103). In this case, the first access point 10-1 may transmit the RADIUS server information using a communication protocol that can be used with the second access point.

The second access point 10-2 receives the RADIUS server information transmitted from the first access point 10-1 (S105). The second access point 10-2 stores the received RADIUS server information in the memory device 13 (S107). In this case, as shown in FIG. 6, the RADIUS server information (the identification information and the secret key of the first access point 10-1) is stored in the second access point 10-2.

In this case, the second access point 10-2 has the secret key generated for the RADIUS client that belongs to the same network segment as the first access point 10-1 that functions as the RADIUS server and exists in the same network 40. As a result, the setting unit 115 of the second access point 10-2 sets the second access point 10-2 to operate as the RADIUS client (the first RADIUS client) (S109).

Next, the first access point 10-1 transmits the stored RADIUS server information to the first L2 switch 20-1 (S111). In this case, the first access point 10-1 and the first L2 switch 20-1 are directly connected to each other. Therefore, the first access point 10-1 can transmit the RADIUS server information to the first L2 switch 20-1 in the first time period. In this case, the RADIUS server information is stored in the LLDP frame and transmitted.

The first L2 switch 20-1 receives the RADIUS server information transmitted from the first access point 10-1 (S115).

The storing unit 203 of the first L2 switch 20-1 stores the received RADIUS server information (S117). As shown in FIG. 7, the RADIUS server information (the identification information of the first access point and the secret key) is stored in the first L2 switch 20-1.

In this case, the first L2 switch 20-1 has the secret key generated for the RADIUS client that belongs to the same network segment as the first access point 10-1 that functions as the RADIUS server and exists in the same network 40. As a result, the setting unit 205 sets the first L2 switch 20-1 to operate as the RADIUS client (also referred to as the second RADIUS client).

Figure 9:
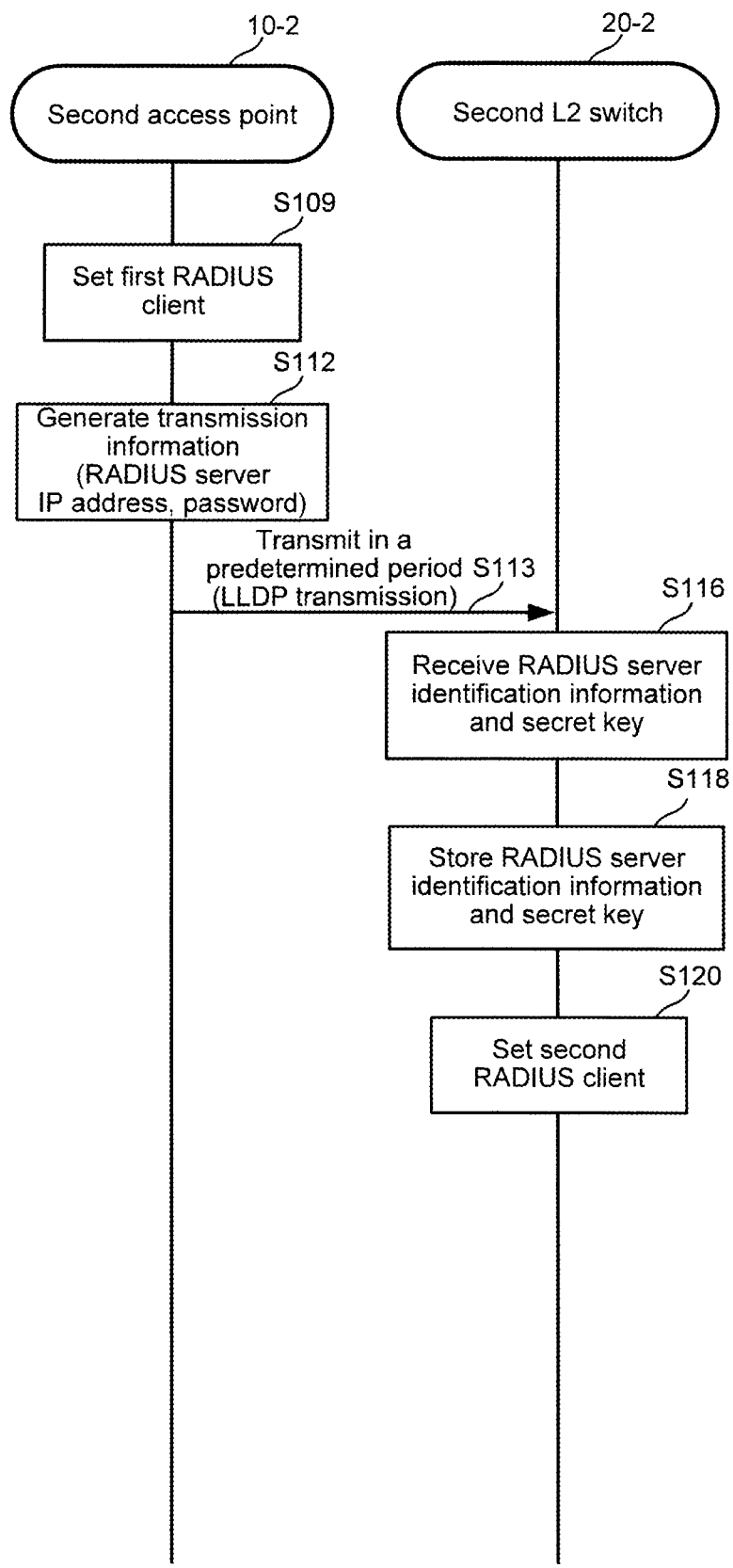
FIG. 9 is a flowchart showing an example of a flow of processing executed by a communication control system according to an embodiment of the present disclosure.

On the other hand, as shown in FIG. 9, the second access point 10-2 generates transmission information for transmitting the RADIUS server information (S112) and transmits the RADIUS server information to the second L2 switch 20-2 (S113). In this case, the second access point 10-2 and the second L2 switch 20-2 are directly connected to each other. Therefore, the second access point 10-2 can transmit the RADIUS server information in the first time period in the same manner as the first access point 10-1. In this case, the RADIUS server information is stored in the LLDP frame and transmitted.

The second L2 switch 20-2 receives the RADIUS server information transmitted from the second access point 10-2 (S116).

The storing unit 203 of the second L2 switch 20-2 stores the received RADIUS server information (S118). The RADIUS server information (the identification information of the first access point and the secret key) is stored in the second L2 switch 20-2.

In this case, the second L2 switch 20-2 has the secret key generated for the RADIUS client that belongs to the same network segment as the first access point 10-1 that functions as the RADIUS server and exists in the same network 40. As a result, the setting unit 205 of the second L2 switch 20-2 sets the second L2 switch 20-2 to operate as the RADIUS client (also referred to as the second RADIUS client).

As a result, the communication control process ends. In the same network segment, the first access point (controller access point) and the second access point (member access point) share the same secret key so that the RADIUS server information can be automatically transmitted to the directly connected L2 switch in the same network segment and the L2 switch can be automatically set to the RADIUS client.

Therefore, by using the present embodiment, it is possible to easily set the RADIUS client without requiring the user to input information.

Second Embodiment

In the present embodiment, a communication control system different from the first embodiment will be described in detail with reference to the drawings. Specifically, a communication control system having an L2 switch connected to the L2 switch will be described.

(2-1. Configuration of Communication Control System)

Figure 10:
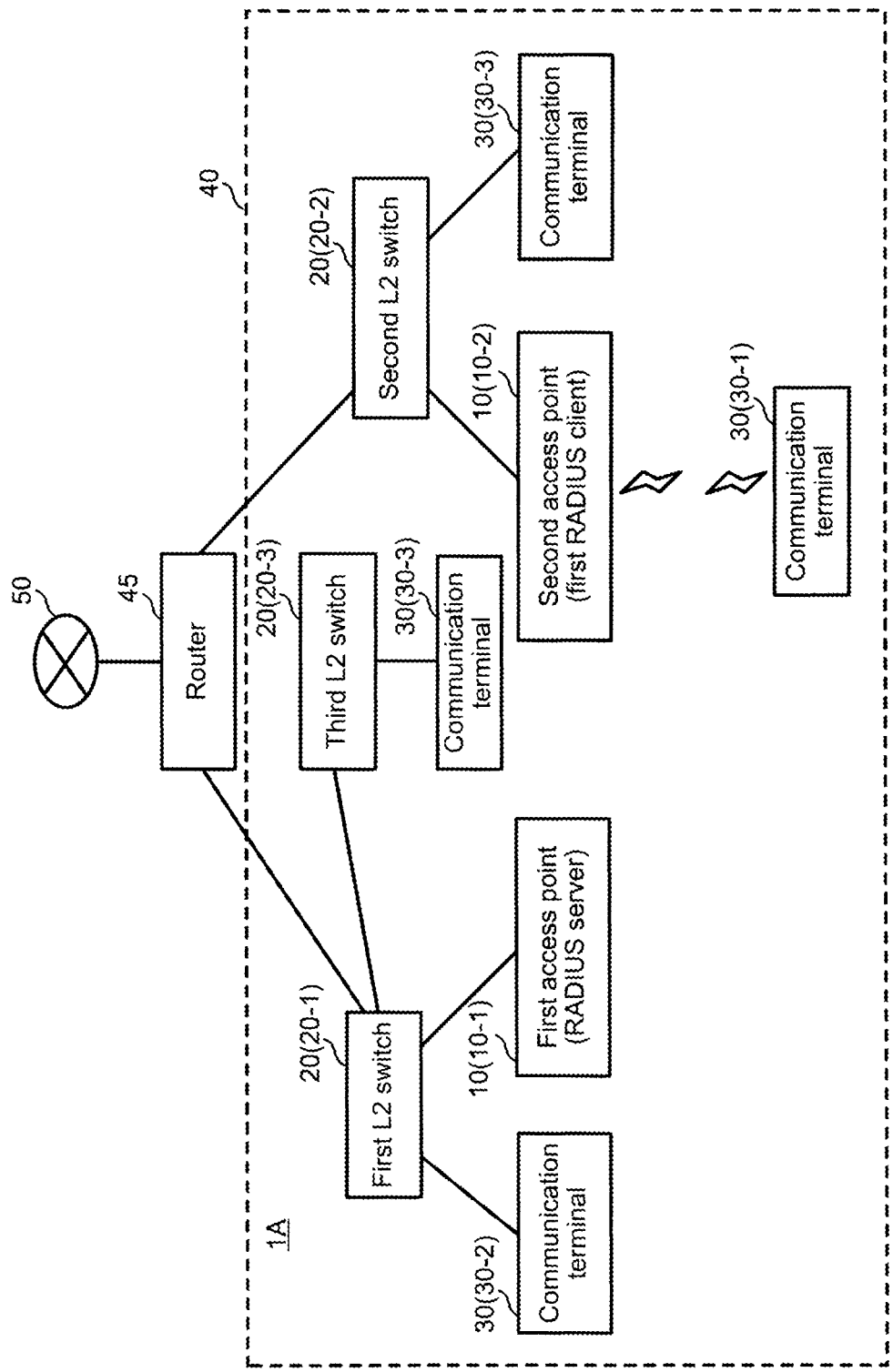
FIG. 10 is a block diagram showing an overall configuration of a communication control system according to an embodiment of the present disclosure.

FIG. 10 is a block diagram showing a configuration of a communication control system 1A. As shown in FIG. 10, the communication control system 1A includes a third L2 switch 20-3 (also referred to as a third network device) in addition to the first access point 10-1, the second access point 10-2, the first L2 switch 20-1, the second L2 switch 20-2, and a plurality of communication terminals 30. The third L2 switch 20-3 is directly connected to at least one of the first L2 switch 20-1 and the second L2 switch 20-2. In the present embodiment, the third L2 switch 20-3 is directly connected to the first L2 switch 20-1. The third L2 switch 20-3 has the same hardware configuration as the first L2 switch 20-1.

Figure 11:
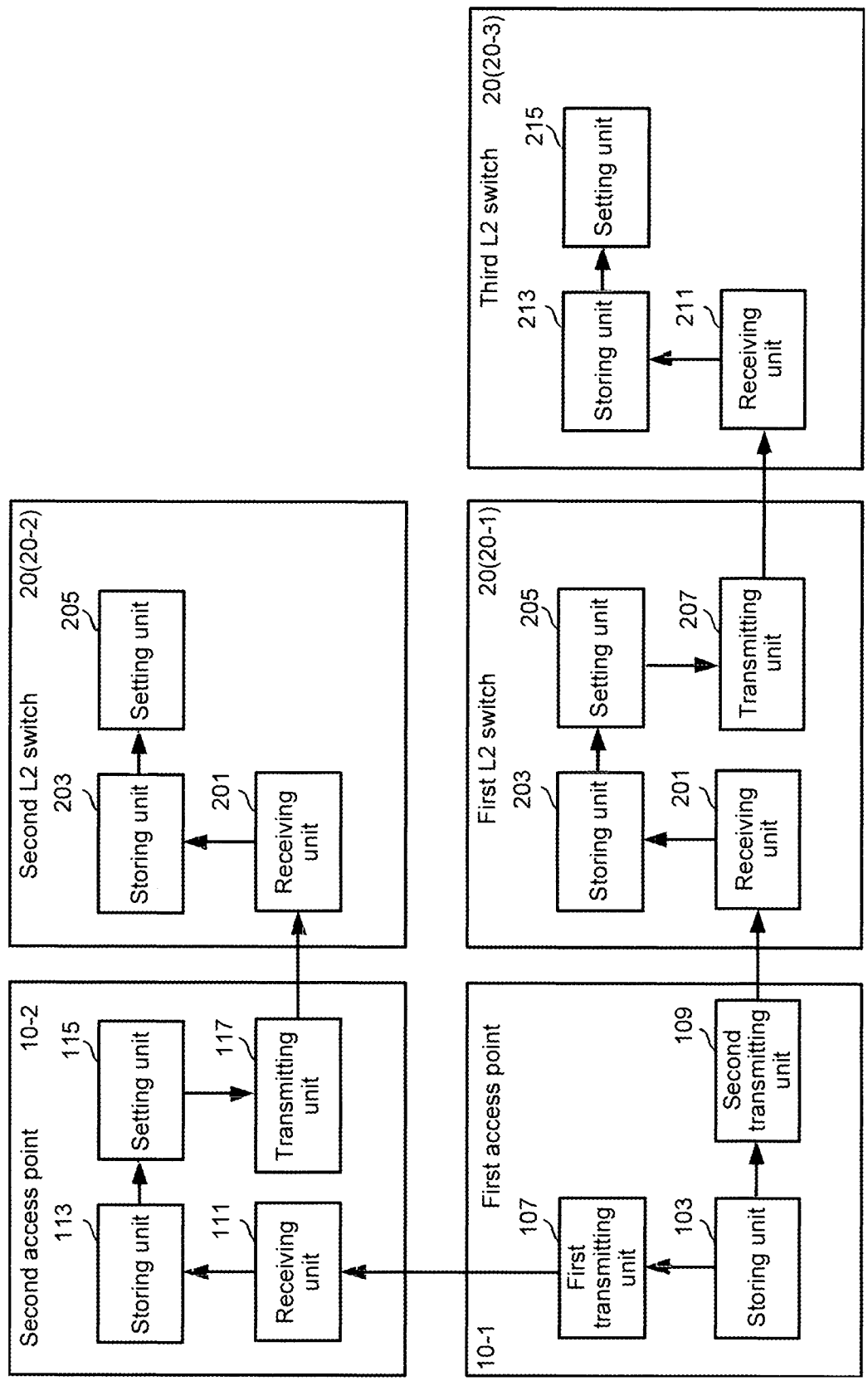
FIG. 11 is a functional block diagram of a communication control system according to an embodiment of the present disclosure.

FIG. 11 is a block-diagram showing an example of a functional configuration of the communication control system 1A. In FIG. 11, the first L2 switch 20-1 includes a transmitting unit 207 in addition to the receiving unit 201, the storing unit 203, and the setting unit 205. The transmitting unit 207 (also referred to as a third transmitting unit) transmits the RADIUS server information to the third L2 switch 20-3. In this case, the first L2 switch 20-1 and the third L2 switch 20-3 are directly connected to each other. Therefore, the transmitting unit 207 can transmit the RADIUS server information within the predetermined time period. For example, the RADIUS server information may be stored in an LLDP (also referred to as a second LLDP) frame that is different from the LLDP (also referred to as a first LLDP) frame received by the first L2 switch 20-1 and transmitted.

The third L2 switch 20-3 includes a receiving unit 211, a storing unit 213, and a setting unit 215.

The receiving unit 211 receives the RADIUS server information transmitted from the first L2 switch 20-1.

The storing unit 213 stores the received RADIUS server information. FIG. 12 is an example of a data set of information 2130 stored in the third L2 switch 20-3. As shown in FIG. 12, the stored information 2130 includes identification information 2130*a* and a secret key 2130*b*. In this case, the RADIUS server information (the identification information of the first access point 10-1 and the secret key) is stored in the third L2 switch 20-3.

The setting unit 215 sets the third L2 switch 20-3 to the RADIUS client based on a predetermined condition.

(2-2. Communication Control Process)

Next, a communication control process based on a command by the communication control program in the communication control system 1A will be described with reference to the drawings. The same processing as in the first embodiment will be omitted as appropriate.

Figure 13:
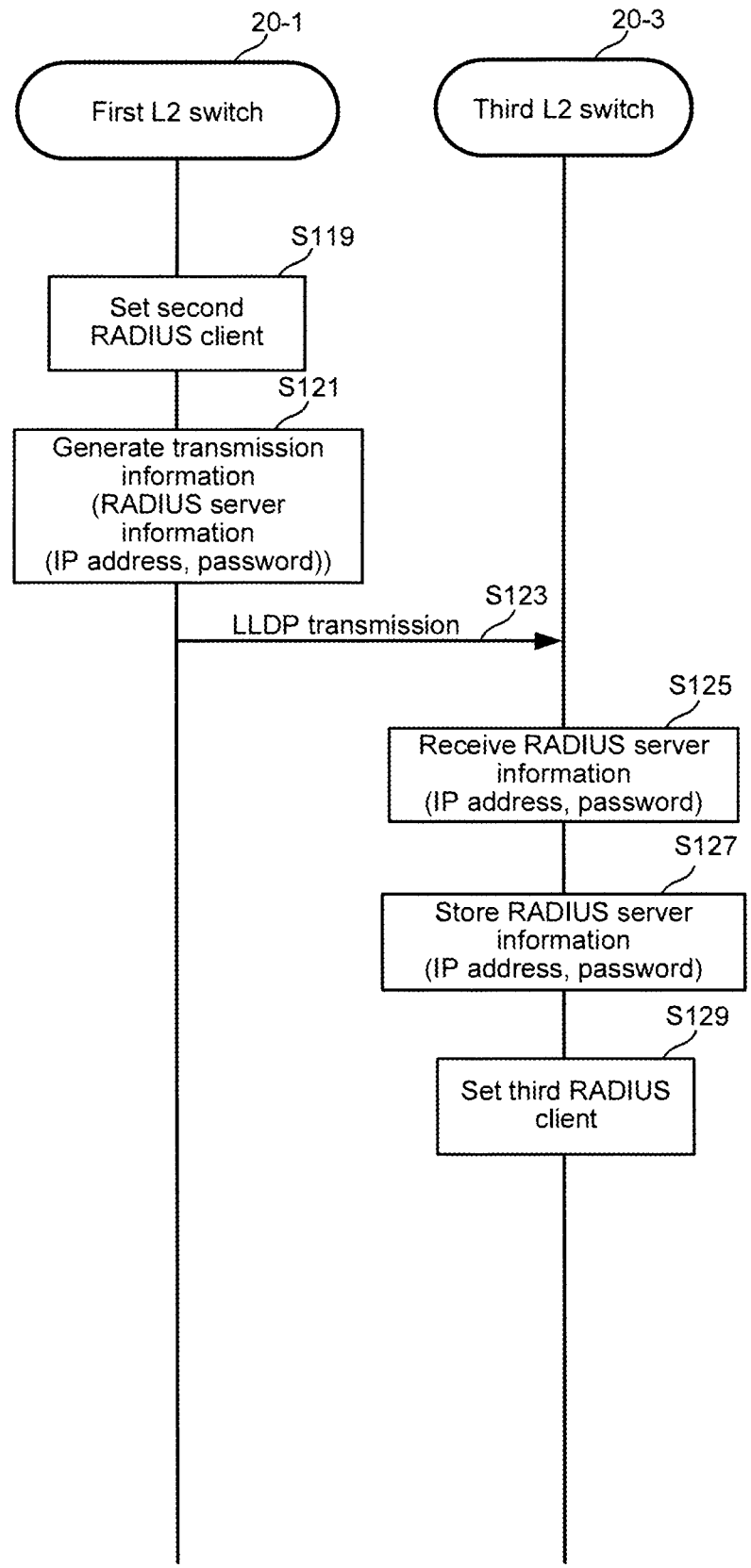
FIG. 13 is a flowchart showing an example of a flow of processing executed by a communication control system according to an embodiment of the present disclosure.

FIG. 13 is a communication control processing flowchart based on a command by a communication control program in the communication control system 1A. When the first L2 switch 20-1 is set as the RADIUS client (S119), the first L2 switch 20-1 generates transmission information for transmitting the stored RADIUS server information to the third L2 switch 20-3 (S121).

The first L2 switch 20-1 transmits the RADIUS server information to the third L2 switch 20-3 (S123). In this case, the first L2 switch 20-1 and the third L2 switch 20-3 are directly connected to each other. Therefore, the RADIUS server information can be stored in a predetermined communication protocol (in this example, LLDP) frame and transmitted. Also, in this case, the LLDP (the second LLDP) frame spontaneously transmitted from the first L2 switch is used as the LLDP frame instead of transferring the LLDP (the first LLDP) frame transmitted from the first access point. As a result, the first L2 switch 20-1 can transmit the RADIUS server information to the third L2 switch 20-3 via the above-described second LLDP frame within the predetermined time period (the first time period).

The third L2 switch 20-3 receives the RADIUS server information transmitted from the first L2 switch 20-1 (S125).

The third L2 switch 20-3 stores the received RADIUS server information (S127). As shown in FIG. 12, the RADIUS server information (the identification information of the first access point and the secret key) is stored in the third L2 switch 20-3.

In this case, the third L2 switch 20-3 has the secret key generated for the RADIUS client that belongs to the same network segment as the first access point 10-1 that functions as the RADIUS server and exists in the same network. As a result, the setting unit 215 of the third L2 switch 20-3 sets the third L2 switch 20-3 to operate as a new RADIUS client (a third RADIUS client) (S129).

By using the present embodiment, even the L2 switch that is not directly connected to the RADIUS server can be easily set as the RADIUS client.

Third Embodiment

In the present embodiment, a communication control method in a communication control system 1B that is different from the communication control system 1 of the first embodiment will be described. More specifically, a communication control method when the RADIUS server information is not received within the predetermined time period will be described.

Figure 14:
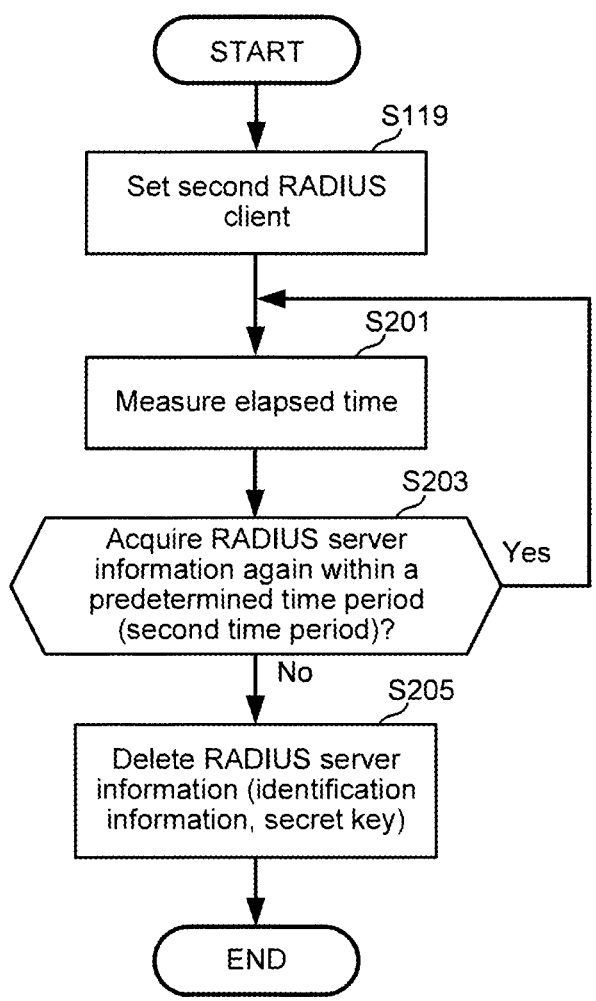
FIG. 14 is a flowchart showing an example of a flow of processing executed by a communication control system according to an embodiment of the present disclosure.

FIG. 14 is a communication control processing flowchart based on a command by a communication control program in the communication control system 1B. When the first L2 switch 20-1 is set as the RADIUS client (the second RADIUS client) (S119), the first L2 switch 20-1 measures the elapsed time (S201).

The first L2 switch 20-1 determines whether to acquire the RADIUS server information again within a predetermined time period (also referred to as a second time period) (S203). The second time period is longer than the first time period described in the first embodiment. If the RADIUS server information is acquired again within the predetermined period (S203; Yes), the process returns to the processing of S201 and loops.

If the RADIUS server information is not received again within the predetermined period (S203; No), the setting unit 205 of the first L2 switch 20-1 deletes the stored RADIUS server information (S205).

By using the present embodiment, if the RADIUS server information is not accepted within the predetermined time period, the already received RADIUS server information is automatically deleted. As a result, the RADIUS client does not need to perform unnecessary inquiry processing to a nonexistent RADIUS server when the communication terminal is no longer connected to the RADIUS server.

Fourth Embodiment

In the present embodiment, a communication control method in a communication control system 1C that is different from the communication control system 1 of the first embodiment will be described. More specifically, a communication control method will be described in which the automatically set RADIUS server information is changed to a fixed setting and held.

Figure 15:
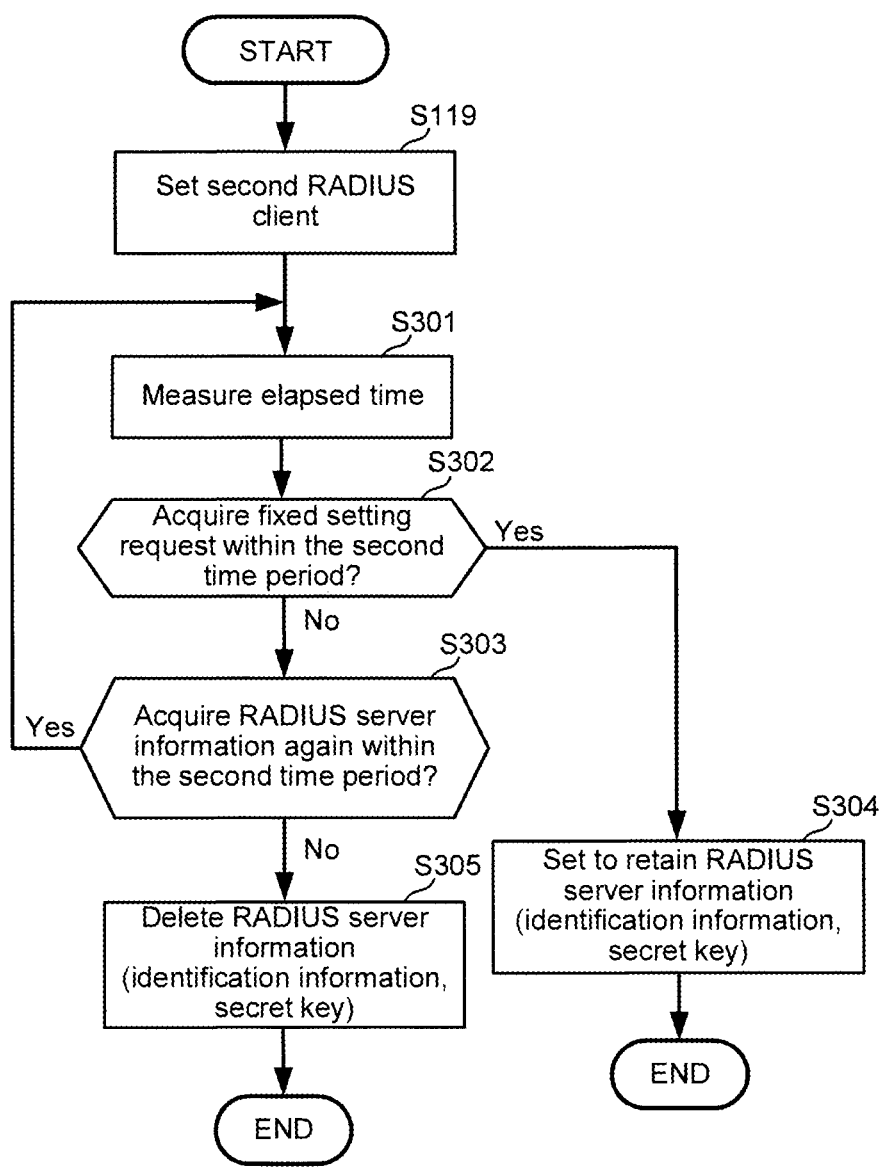
FIG. 15 is a flowchart showing an example of a flow of processing executed by a communication control system according to an embodiment of the present disclosure.

FIG. 15 is a communication control process flowchart based on a command by a communication control program in the communication control system 1C. As shown in FIG. 15, when the first L2 switch 20-1 is set as the RADIUS client (S119), the first L2 switch 20-1 measures the elapsed time (S301).

A control unit of the first L2 switch 20-1 determines whether a request for registering the RADIUS server information as fixed setting information (hereinafter, referred to as a "fixed setting request") based on an input from the user is accepted within a predetermined time period (also referred to as a second time period, TTL (Time to Live)) (S302). The second time period is longer than the first time period described in the first embodiment. When the fixed setting request is acquired by the first L2 switch 20-1 within the second time period (S302; Yes), the first L2 switch 20-1 performs a setting so as not to delete the stored RADIUS server information even after the second time period has elapsed (S304).

If the fixed setting request is not acquired within the second time period (S302; No), the first L2 switch 20-1 determines whether the RADIUS server information is received again within the predetermined time period (the second time period) (S303). If the RADIUS server information is acquired again within the second time period (S303; Yes), the process returns to S301 and loops. If the RADIUS server information is not acquired again within the second period (S303; No), the first L2 switch 20-1 deletes the RADIUS server information (S305).

By using the present embodiment, the RADIUS server information can be held even after a certain time period has elapsed, or the RADIUS server information that has already been received can be deleted when the RADIUS server information is not received within a certain time period. As a result, it is not necessary to perform unnecessary authentication processing, and exceptional communication control processing can also be performed.

Modifications

Also, within the spirit of the present disclosure, it is understood that various modifications and changes can be made by those skilled in the art and that these modifications and changes also fall within the scope of the present disclosure. For example, the addition, deletion, or design change of components, or the addition, deletion, or condition change of processes as appropriate by those skilled in the art based on each of the above-described embodiments are included in the scope of the present disclosure as long as they are provided with the gist of the present disclosure.

In the communication device according to an embodiment of the present disclosure, the first network device may be an access point.

In the communication device according to an embodiment of the present disclosure, the second network device may be an L2 (Layer 2) switch.

In the communication device according to an embodiment of the present disclosure, the first network device includes a first access point functioning as the RADIUS server and a second access point functioning as the first RADIUS client, the second network device includes a first L2 switch and a second L2 switch, and the first access point includes a third processor; and a third memory device configured to store a third program, the third program being executed by the third processor to cause the third processor to: transmit the identification information and the secret key to the first L2 switch in a first time period, and the second access point including a fourth processor; and a fourth memory device configured to store a fourth program, the fourth program being executed by the fourth processor to cause the fourth processor to: receive the identification information and a secret key transmitted from the first access point; store the identification information and the secret key; and set the second access point based on the identification information and the secret key so that the first network device operates as the first RADIUS client; and transmit the identification information and the secret key to the second L2 switch in the first time period.

In the communication device according to an embodiment of the present disclosure, the second program may cause the processor to transmit the identification information and the secret key to a third network device directly connected in the same network segment in the first time period.

In the communication device according to an embodiment of the present disclosure, the identification information and the secret key may be stored in an LLDP (Link Layer Discovery Protocol) frame and transmitted.

In the communication device according to an embodiment of the present disclosure, the second program may cause the processor to delete the identification information and the secret key stored in the second network device when the identification information and the secret key are not received in a second time period longer than the first time period.

In the communication device according to an embodiment of the present disclosure, the second program may cause the processor to retain the identification information and the secret key stored in the second memory after the second time period elapses when receiving a setting request for the identification information and the secret key.

In addition, according to an embodiment of the present disclosure, there is provided a network device including: a processor; and a memory device configured to store a program, the program being executed by the processor to cause the processor to: receive identification information for identifying a RADIUS server and a secret key, the identification information and the secret key being transmitted from an access point in a first time period, and the access point functioning as the RADIUS server or a first RADIUS client corresponding to the RADIUS server, store the identification information and the secret key, and set the network device based on the identification information and the secret key so that the network device operates as a second RADIUS client.

In the network device according to an embodiment of the present disclosure, the program may cause the processor to transmit the identification information and the secret key to another network device directly connected in the same network segment in the first time period.

In the network device according to an embodiment of the present disclosure, the program may cause the processor to delete the identification information and the secret key stored in the second network device when the identification information and the secret key are not received in a second time period longer than the first time period.

In addition, according to an embodiment of the present disclosure, there is provided a network device functioning as a RADIUS server or a RADIUS client corresponding to the RADIUS server, the network device including: a processor, and a memory device configured to store a program, the program being executed by the processor to cause the processor to: store identification information for identifying the RADIUS server and a secret key; and transmit the identification information and the secret key to another network device directly connected in the same network segment in a first time period.

In addition, according to an embodiment of the present disclosure, there is provided a communication method including: transmitting identification information and a secret key to a second network device in a first time period by a first network device, the first network device functioning as a RADIUS server configured to determine whether to authenticate a network communication of a terminal, or a first RADIUS client corresponding to the RADIUS server, and storing the identification information for identifying the RADIUS server and the secret key, receiving the identification information and the secret key transmitted from the first network device by the second network device, and setting the second network device based on the identification information and the secret key so that the second network device operates as a second RADIUS client corresponding to the RADIUS server.

In the communication method according to an embodiment of the present disclosure, the first network device may be an access point.

In the communication method according to an embodiment of the present disclosure, the second network device may be an L2 (Layer 2) switch.

In the communication method according to an embodiment of the present disclosure, the first network device includes a first access point functioning as a RADIUS server and a second access point functioning as a first RADIUS client, the second network device includes a first L2 switch and a second L2 switch, and the communication method further includes: transmitting the identification information and the secret key to the first L2 switch in a first time period by the first access point; receiving the identification information and the secret key transmitted from the first access point by the second access point; storing the identification information and the secret key by the second access point; setting the first network device based on the identification information and the secret key by the second access point so that the first network device operates as the first RADIUS client; and transmitting the identification information and the secret key to the second L2 switch in the first time period by the second access point.

The communication method according to an embodiment of the present disclosure further includes transmitting the identification information and the secret key to a third network device directly connected in the same network segment in the first time period.

In the communication method according to an embodiment of the present disclosure, the identification information and the secret key may be stored in an LLDP (Link Layer Discovery Protocol) frame and transmitted.

The communication method according to an embodiment of the present disclosure further includes deleting the identification information and the secret key stored in the second network device when the identification information and the secret key are not received in a second time period longer than the first time period.

The communication method according to an embodiment of the present disclosure further includes retaining the identification information and the secret key stored in the second network device after the second time period elapses when the second network device receives a setting request for the identification information and the secret key.

In addition, according to an embodiment of the present disclosure, there is provided a non-transitory computer readable storage medium storing a program for causing a computer to: transmit identification information and a secret key to a second network device in a first time period by a first network device, the first network device functioning as a RADIUS server configured to determine whether to authenticate a network communication of a terminal, or a first RADIUS client corresponding to the RADIUS server, and storing the identification information for identifying the RADIUS server and the secret key, receive the identification information and the secret key transmitted from the first network device by the second network device, and set the second network device based on the identification information and the secret key so that the second network device operates as a second RADIUS client corresponding to the RADIUS server.

In addition, the present disclosure can also be understood as an invention of a method (a relay method and an information processing method).

In the first embodiment of the present disclosure, although an example in which the RADIUS server information is stored in the LLDP frame and transmitted is shown, the present disclosure is not limited thereto. If the communication protocol is a communication protocol that can be transmitted at a predetermined time period, the RADIUS server information may be stored in a frame of another communication protocol and transmitted.

In the first embodiment of the present disclosure, although an example in which the RADIUS server information includes the identification information (IP address) and the secret key is described, the present disclosure is not limited thereto. For example, the RADIUS server information may include information on the authentication UDP port number of the RADIUS server, information on response waiting times for the request to the RADIUS server, and information on the number of retransmissions of the request to the RADIUS server, and the like.

In addition, in the first embodiment of the present disclosure, although an example in which the first access point 10-1 functions as the RADIUS server and the second access point 10-2 functions as the RADIUS client is shown, the present disclosure is not limited thereto. The access point 10 may appropriately control the function according to the setting. For example, information for switching the setting may be transmitted from the second access point 10-2 to the first access point 10-1. As a result, the RADIUS servers may be switched.

In addition, in the first embodiment of the present disclosure, although an example in which the first access point functions as the RADIUS server, the present disclosure is not limited thereto. For example, the L2 switch 20 may function as the RADIUS server.

What is claimed is:

1. A communication system comprising:
   a first network device comprising a RADIUS (Remote Authentication Dial-in User Service) server configured to determine whether to authenticate a network communication of a terminal, or a first RADIUS client corresponding to the RADIUS server and storing identification information identifying the RADIUS server and a secret key, and
   a second network device directly connected to the first network device in a same network segment as the first network device; wherein
   the first network device comprises:
      a first processor; and
      a first memory device configured to store a first program, the first program being executed by the first processor to cause the first processor to:
      transmit the identification information and the secret key to the second network device in a first time period, and
   the second network device comprises:
      a second processor; and
      a second memory device configured to store a second program, the second program being executed by the second processor to cause the second processor to:
      receive the stored identification information and the secret key transmitted from the first network device, and
      set the second network device based on the identification information and the secret key so that the second network device operates as a second RADIUS client corresponding to the RADIUS server,
   wherein
   the first network device comprises a first access point having a function of the RADIUS server and a second access point having a function of the first RADIUS client,
   the second network device comprises a first L2 (Layer 2) switch and a second L2 switch,
   the first access point comprises:
      a third processor; and
      a third memory device configured to store a third program, the third program being executed by the third processor to cause the third processor to:
      transmit the identification information and the secret key to the first L2 switch in the first time period, and
   the second access point comprises:
      a fourth processor; and
      a fourth memory device configured to store a fourth program, the fourth program being executed by the fourth processor to cause the fourth processor to:
      receive the identification information and the secret key transmitted from the first access point;
      store the identification information and the secret key;
      set the second access point based on the identification information and the secret key so that the first network device operates as the first RADIUS client; and
      transmit the identification information and the secret key to the second L2 switch in the first time period.

2. The communication system according to claim 1, wherein
   the second program causes the second processor to:
   transmit the identification information and the secret key to a third network device directly connected in the same network segment in the first time period.

3. The communication system according to claim 1, wherein
   the identification information and the secret key are stored in a LLDP (Link Layer Discovery Protocol) frame and transmitted.

4. The communication system according to claim 1, wherein
the second program causes the second processor to:
delete the identification information and the secret key stored in the second network device in response to the identification information and the secret key not being received in a second time period longer than the first time period.

5. The communication system according to claim 1, wherein
the second program causes the second processor to:
retain the identification information and the secret key stored in the second memory after a second time period elapses in response to receiving a setting request for the identification information and the secret key, wherein the second time period is longer than the first time period.

6. A communication method comprising:
transmitting identification information and a secret key to a second network device in a first time period by a first network device, the first network device comprising a RADIUS server configured to determine whether to authenticate a network communication of a terminal, or a first RADIUS client corresponding to the RADIUS server and storing the identification information for identifying the RADIUS server and the secret key;
receiving the identification information and the secret key transmitted from the first network device by the second network device; and
setting the second network device based on the identification information and the secret key so that the second network device operates as a second RADIUS client corresponding to the RADIUS server,
wherein
the first network device comprises a first access point having a function of a RADIUS server and a second access point having a function of the first RADIUS client,
the second network device comprises a first L2 (Layer 2) switch and a second L2 switch, and
the communication method further comprises:
transmitting the identification information and the secret key to the first L2 switch in the first time period by the first access point;
receiving the identification information and the secret key transmitted from the first access point by the second access point;
storing the identification information and the secret key by the second access point;
setting the first network device based on the identification information and the secret key by the second access point so that the first network device operates as the first RADIUS client; and
transmitting the identification information and the secret key to the second L2 switch in the first time period by the second access point.

7. The communication method according to claim 6 further comprising:
transmitting the identification information and the secret key to a third network device directly connected in a same network segment in the first time period.

8. The communication method according to claim 6 further comprising:
storing and transmitting the identification information and the secret key in a LLDP (Link Layer Discovery Protocol) frame.

9. The communication method according to claim 6 further comprising:
deleting the identification information and the secret key stored in the second network device in response to the identification information and the secret key not being received in a second time period longer than the first time period.

10. The communication method according to claim 6 further comprising:
retaining the identification information and the secret key stored in the second network device after a second time period elapses in response to the second network device receiving a setting request for the identification information and the secret key, wherein the second time period is longer than the first time period.

11. A non-transitory computer readable storage medium storing a program that, when executed by a computer, causes the computer to:
transmit identification information and a secret key to a second network device in a first time period by a first network device, the first network device functioning as a RADIUS server configured to determine whether to authenticate a network communication of a terminal, or a first RADIUS client corresponding to the RADIUS server and storing the identification information for identifying the RADIUS server and the secret key;
receive the identification information and the secret key transmitted from the first network device by the second network device; and
set the second network device based on the identification information and the secret key so that the second network device operates as a second RADIUS client corresponding to the RADIUS server,
wherein
the first network device comprises a first access point having a function of a RADIUS server and a second access point having a function of a first RADIUS client,
the second network device comprises a first L2 (Layer 2) switch and a second L2 switch, and
the program further causes the computer to:
transmit the identification information and the secret key to the first L2 switch in the first time period by the first access point;
receive the identification information and the secret key transmitted from the first access point by the second access point;
store the identification information and the secret key by the second access point;
set the first network device based on the identification information and the secret key by the second access point so that the first network device operates as the first RADIUS client; and
transmit the identification information and the secret key to the second L2 switch in the first time period by the second access point.

* * * * *